UNITED STATES PATENT OFFICE.

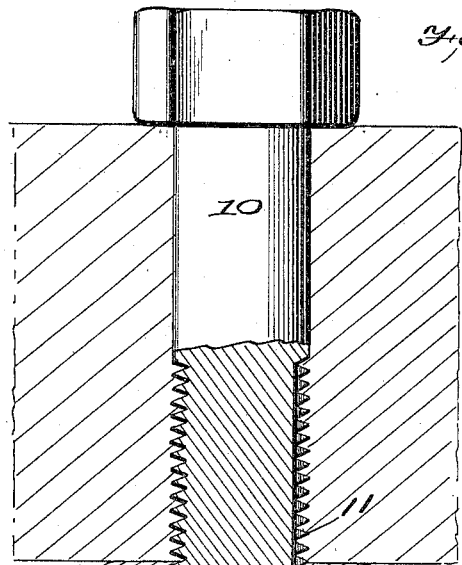
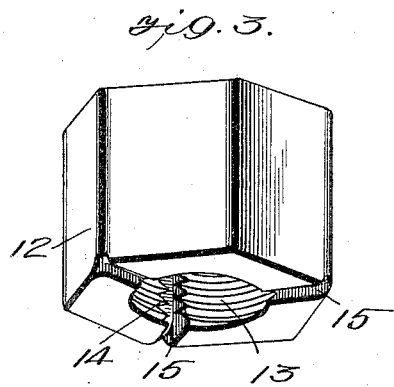
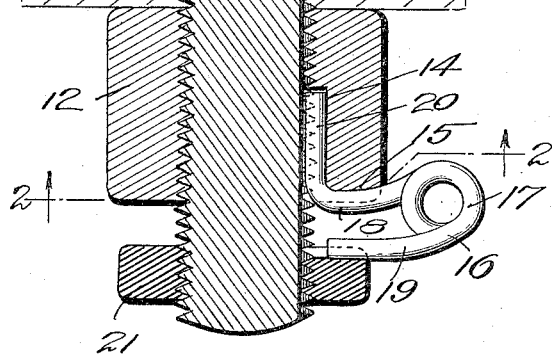
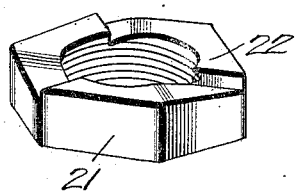
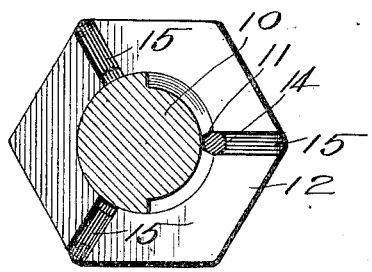
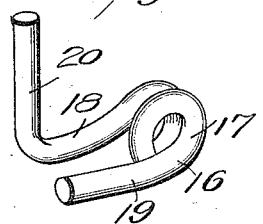

HERBERT BUSH PLOPPER, OF LITCHFIELD, ILLINOIS.

ANTIRATTLING NUT-LOCK.

1,182,310.  Specification of Letters Patent.  Patented May 9, 1916.

Application filed June 17, 1915. Serial No. 34,622.

*To all whom it may concern:*

Be it known that I, HERBERT B. PLOPPER, a citizen of the United States, and a resident of Litchfield, in the county of Montgomery and State of Illinois, have invented an Improvement in Antirattling Nut-Locks, of which the following is a specification.

This invention is an improvement in locks and has particular reference to a novel construction of nut lock.

An object of the invention is to provide a locking device which is so constructed as to effectively prevent accidental displacement of the nut and rattling of the parts which is often incident to constructions of this character.

Another object of the invention is the provision of a nut lock composed of a minimum number of parts which are extremely simple in construction and therefore easily and inexpensively manufactured, and one which is durable and effective in carrying out the purpose for which it is designed.

The inventive idea involved is capable of receiving a variety of mechanical expressions, one of which, for the purpose of illustrating the invention, is shown in the accompanying drawing, in which—

Figure 1 is a longitudinal sectional view of a nut lock constructed in accordance with the invention. Fig. 2 is a section on the line 2—2 of Fig. 1. Fig. 3 is a perspective view of the locked nut used in connection with the invention. Fig. 4 is a similar view of the locking nut. Fig. 5 is a similar view of the locking spring.

Referring more particularly to the drawings, the numeral 10 indicates a bolt of any preferred construction having the usual screw threads thereon and provided with a longitudinal channel 11.

The nut 12 which is adapted to be locked on the bolt is provided with the usual screw threaded opening 13 and, in addition, has formed therein a plurality of longitudinal grooves 14 which extend from one end to approximately half the length of said nut, said grooves being formed in the walls of said opening 13. For each of the grooves 14 there is formed in one end of the nut a radial groove 15, the inner end of which communicates with the adjacent end of the first-mentioned groove.

A locking device is provided for the nut 12 and comprises a brass non-rusting spring member generally indicated by 16, said member having a coil 17 intermediate the ends thereof for the purpose of lending a proper amount of resiliency to the member for a purpose which will appear in the course of the description.

The end portion 18 of the member 16 is of greater length than the end portion 19 thereof and has its extremity 20 bent at substantially right angles to the main portion. The nut 12 is adjusted on the bolt 10 until any one of the longitudinal grooves 14 therein registers with the channel 11 in said bolt whereupon the extremity 20 of the spring member 16 may be inserted into the opening formed by said groove and channel until the portion 18 of said spring member engages the contiguous groove 15. When the spring member is in this position the coil 17 thereof extends beyond the outer sides of the nut 12 and the end 19 thereof projects inwardly toward the longitudinal axis of the bolt 10.

After the nut 12 has been placed in position against a support and it is desired to lock the same in place, a locking nut 21 of comparatively small thickness is threaded upon the outer extremity of the bolt 10 and has upon its inner face, or that opposed to the end of the nut 12 having the grooves 15 therein, a ratchet 22. This nut 21 is threaded inwardly upon the bolt until it engages with the end 19 of the spring member 16 and sufficient pressure is exerted upon said end to effectively lock the parts upon the bolt, whereupon one of the teeth of the ratchet 22 may be engaged with said end 19 thereby preventing any further turning movement of the nut 21 in the opposite direction.

I claim:—

1. In a nut lock, the combination of a bolt having a longitudinal channel therein, a nut on said bolt having a longitudinal groove extending partially the length thereof, and adapted to register with said channel, said nut being also provided in one end thereof with a radial groove communicating with said longitudinal groove, a locking device associated with said nut and including a spring member having a coil intermediate the ends thereof, one end of said member being bent to provide a portion adapted to be inserted into said longitudinal groove and channel, the other portion of said end being adapted to engage said radial groove, and a nut having a ratchet face mounted on the said bolt and adapted to engage the other extremity of said spring member.

2. A nut lock, comprising a bolt having a longitudinal channel, coöperating nuts, one of which is provided with communicating longitudinal and radial grooves therein, the other nut having a ratchet face, and a spring member having one end bent to engage the grooves in the first-mentioned nut and channel in said bolt, the other end thereof being adapted to engage said ratchet, said spring being coiled intermediate its ends and having a portion mounted in said channel.

3. A nut lock, comprising a bolt having a channel, coöperating nuts mounted on said bolt, one of which is provided with communicating longitudinal and radial grooves therein, the other nut having a ratchet face, and a locking device interposed between said nuts and engaging said grooves and said channel and ratchet face therein.

4. A nut lock, comprising a bolt having a longitudinal channel, coöperating nuts provided with grooves and a ratchet face, and a locking device for said nuts including a spring member coiled intermediate its ends, one of the ends of said member being of greater length than the other and bent to provide an extremity adapted to engage said grooves and said channel, the other end of said spring member being adapted to engage said ratchet.

5. A nut lock comprising a bolt having a channel, a nut threaded on the bolt, a follower nut also threaded on the bolt, and a spring member having one end projecting into said channel and one of said nuts and its other end engaging the other nut, said member being coiled intermediate its ends.

HERBERT BUSH PLOPPER.

Witnesses:
ARDELLA WARREN,
BERTHA A. THORP.